July 16, 1968  G. O. JACKSON  3,393,125
TESTING FOR FUEL ELEMENT SHEATHING FAILURES IN NUCLEAR REACTORS
Filed Nov. 7, 1966
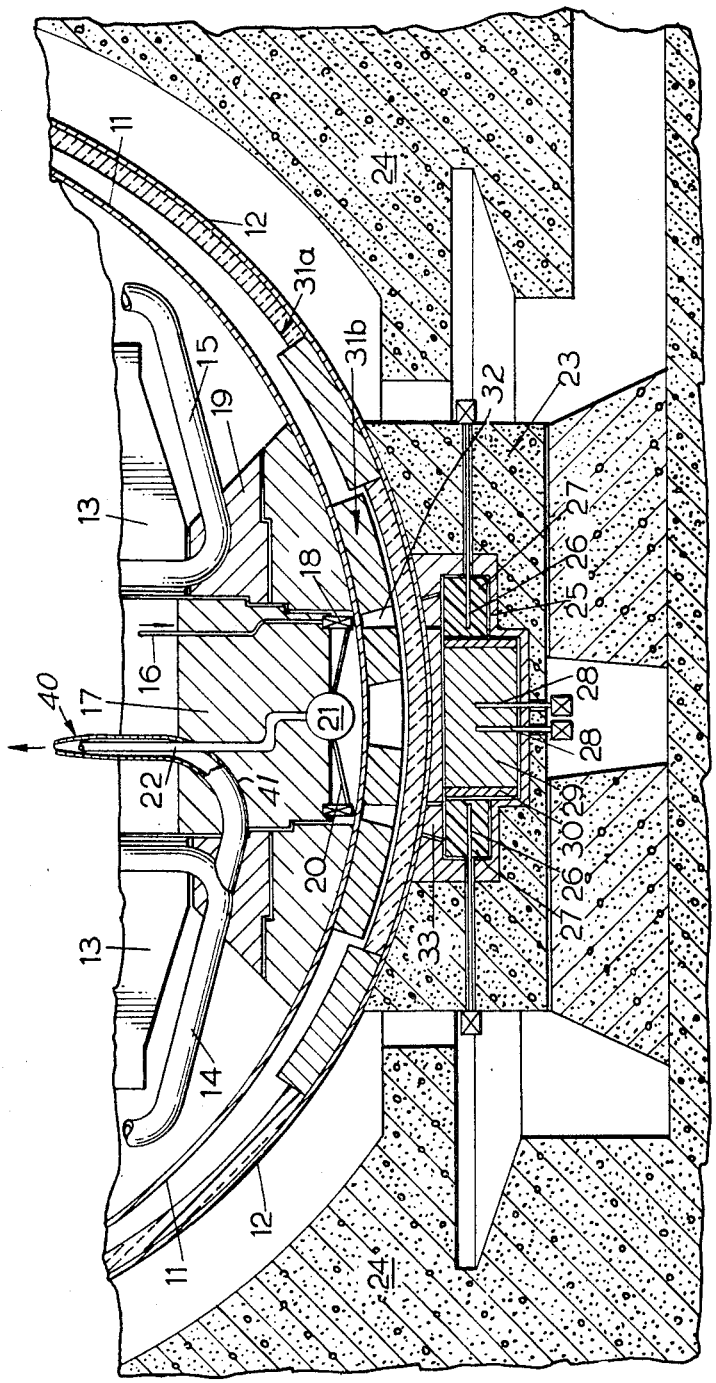

3,393,125
TESTING FOR FUEL ELEMENT SHEATHING FAILURES IN NUCLEAR REACTORS

George Oliver Jackson, Timperley, England, assignor to United Kingdom Atomic Energy Authority, London, England
Filed Nov. 7, 1966, Ser. No. 592,487
Claims priority, application Great Britain, Nov. 12, 1965, 48,260/65; Apr. 27, 1966, 18,534/66
3 Claims. (Cl. 176—19)

ABSTRACT OF THE DISCLOSURE

For testing for the occurrence of fuel element sheathing failures in nuclear reactors of the kind including a core having fuel elements disposed in coolant channels with the core contained in a vessel, suitable apparatus comprises a sample chamber within the vessel and shielded from core radiation, means for conveying coolant samples from a fuel element channel outlet through the sample chamber via a sample pipe, a detector disposed outside the vessel and able to detect neutrons resulting from a sheathing failure and emitted from a coolant sample in the chamber, and means for confining the emitted radiation to the locality of the detector with attenuation of radiation other than neutrons.

---

The present invention relates to a method of, and apparatus for, testing for the occurrence of fuel element sheathing failures in nuclear reactors.

Existing methods most extensively applied depend on sampling the coolant which flows through the reactor core. It is commonly the case that the core has separate coolant channels in which the fuel elements are disposed; by sampling the channels individually or in small groups, the indication of a failure can be traced more or less exactly to a particular channel. For detecting a failure, the coolant samples are monitored for the precipitation of solid daughter products of fission product gases or for the emission of delayed neutrons. It is with a test based on delayed neutron monitoring that the invention is concerned.

Among typical fission products, the iodine isotope $I^{137}$ and the bromine isotope $Br^{87}$ decay with the emission of a neutron. However these isotopes have half-lives which are short, i.e. 24 and 54.5 seconds respectively, and therefore the sooner a sample containing them can be presented to a neutron detector the better their presence will be indicated.

In one of its aspects, the invention lies in conducting a coolant sample as rapidly as is feasible to a location at the inner wall surface of a vessel containing the core and detecting from outside the vessel the emission of neutrons from the sample at such location. Neutrons from the decay of the isotopes already mentioned are emitted with high energy and can be expected to traverse various constructions of vessel wall quite easily. By detecting through the vessel wall, the neutron detector can remain outside without having to bring coolant over a longer, and probably circuitous, route to the same external point; consequently the coolant presented to the detector is fresher and therefore richer in the neutron emitting fission products released from a failed sheath.

According to this first aspect of the invention, a nuclear reactor with a core having fuel elements in coolant channels would comprise a sample chamber located at the inner wall surface of a vessel containing the core, a sampling pipe leading to the chamber from a channel outlet for feeding a coolant sample to the chamber, and a neutron detector disposed outside the vessel adjacent the chamber location for detecting neutrons emitted from a sample in the chamber. Some kinds of reactor coolant may be more amenable to satisfactory performance of the invention than others; with water coolant, for instance, neutron emitting $N^{17}$ arising from irradiation of the oxygen content may provide a background count of neutrons over which even the improved count of fission product neutrons obtainable with the invention cannot be distinguished to the stipulated degree of sensitivity. A background of this sort does not arise with a liquid metal coolant like sodium and it is with such a coolant in mind that the invention has been evolved. In the case of sodium, the isotope $Na^{24}$ is an energetic gamma ray emitter but this calls only for an attenuating barrier to prevent the gamma rays entering the detector whilst allowing passage for the neutrons. Of course neutrons from the chain reaction in the core should be prevented as far as possible from creating a background in the detector, and in the region of the detector and the sample location a higher standard of neutron shielding than elsewhere may be desirable. This higher standard may be achieved by housing the sample location or chamber in a mass of neutron shielding, such as borated graphite. If the vessel wall construction is a composite one, as in the case of a double wall having interposed thermal insulation, it may be desirable that similar shielding is included in the wall construction in the region of the detector.

In a liquid metal cooled reactor, there is generally very little pressurisation of the coolant; consequently, on the outlet side of the core from where the samples have to be taken there may be insufficient pressure head to obtain the requisite rapid flow through sampling pipes, bearing in mind that such pipes will be of small bore.

According to a second aspect of the invention, a sample chamber communicating through a sampling pipe with a channel outlet of the core is provided at its outlet with an injector for drawing coolant through the sampling pipe to the chamber, the injector being connected for supply from the delivery of a pump which circulates coolant through the core. If there are many separate chambers, a group of such chambers may be connected to a single injector. An injector avoids moving parts; it also makes unnecessary any connection to an external power source as in the case of an electromagnetic pump. These factors give a wide freedom of choice in the positioning of the injector in the core-containing vessel and therefore help considerably in keeping the sampling pipework short.

A particular application of the invention will now be considered in greater detail with reference to the accompanying drawing.

In the drawing there is shown the lower portion of a suspended vessel or tank of double wall construction, the two walls being indicated 11 and 12. This is the tank of a sodium-cooled fast reactor in which the core and primary coolant circuit are submerged in a reservoir of the coolant. Beamwork by which is carried a core support structure appears in outline at 13; coolant supply pipes through which coolant drawn from the reservoir is pumped to an inlet plenum in the support structure are indicated at 14 and 15. Fuel assemblies of which the core is composed are grouped in clusters of six, each cluster surrounding a structural member such as a control element guide tube. The sampling pipes are conveniently carried by these structural members, the arrangement being that each sampling pipe extracts a sample flow from the upper outlet end of an associated assembly or group of assemblies.

The sampling pipes, of which one is indicated at 16, pass through a neutron shield plug 17 to respective sample chambers 18 arranged in a ring adjacent the lowermost extremity or bottom of the tank, these chambers being shielded from core radiations not only by the plug but also by steel shielding 19 in the form of a plinth in which the plug is fitted. Radial pipes such as 20 connect the sample chambers in common to a spherical collector vessel 21 which is situated in the middle of the ring of chambers and has a discharge passage 22. A sample flow proceeds through each of the sampling pipes and hence through the sample chambers and the collector vessel; to promote such flow some form of pumping action is provided, for example by means of an injector 40 connected to the discharge passage 22 and supplied with a by-pass stream 41 of the pumped inlet coolant, or by means of an electromagnetic pump, it being feasible with the latter to have an electromagnetic pumping effect on each individual sampling pipe.

Externally of and adjacent the bottom of the tank is an instrument block indicated generally 23, and the concrete walling 24 surrounding the tank is formed with chambers and an access tunnel to permit servicing of the instruments in this block. The main body of the block is concrete and in a central cavity of this body is an assembly of neutron detectors in an envelope 25 of lead. The detector assembly is composed of a ring of boron trifluoride ($BF_3$) neutron counters 26 each embedded in a block of solid hydrogeneous moderator 27, such as polyethylene, and a central unit having similar counters 28 embedded in a cylindrical block 29, this block being also of a solid moderator, which is graphite in the present example, and being shielded from the ring of counters by an interposed annulus of cast iron 30.

Steel and graphite shielding interposed in conjunction with thermal insulation 31a between the walls 11 and 12 of the tank and indicated generally 31b is arranged to provide apertures, such as 32, affording neutron-transparent paths by which delayed neutrons emitted by the sample chambers and the collector vessel are directed, rather in the manner of collimated beams, to the appropriate counter, that is to say, the associated counter 26 in the case of each sample chamber and the counters 28 in the case of the collector vessel. In alignment with the shielding apertures 32 for the sample chambers there are "windows" 33 of graphite, in the lead envelope 25 of the instrument block 23; in the path to the counters 28 the lead envelope is thinner by virtue of the concavity formed over its upper face to match the shape of the bottom of the tank and is sufficiently thin not to impede the neutrons unduly.

The sample chambers 18, together with their respective counters 26, act as a burst location facility in that an increase of the count rate at any particular counter 26 can be treated as indicating that fission products responsible for the increase have been released in that part of the core to which the sampling pipe of the associated sample chamber leads.

The collector vessel 21, together with its counters 28, acts as a so-called trip facility in that the counters 28, which register total as distinct from local delayed neutron activity, are so connected electrically with trip circuitry of the reactor as to initiate a shut-down of the reactor automatically in the event of the output of the counters 28 exceeding a preselected level.

I claim:
1. Apparatus for testing for the occurrence of fuel element sheathing failure in a nuclear reactor with a core having fuel elements disposed in coolant channels, said core being contained in a vessel, comprising a sample chamber located at the inner wall surface of the vessel, neutron shield means for shielding said sample chamber from core radiations, a sampling pipe wholly within the vessel and communicating between said chamber and the outlet of a fuel element channel, auxiliary means operable for drawing coolant samples from said channel outlet through said sampling pipe and said sampling chamber, a neutron detector disposed outside said vessel and adjacent said chamber for detecting neutrons emitted from a coolant sample in said chamber, attenuating barrier means interposed between said neutron detector and said sample chamber for obstructing the passage to the detector of emissions other than neutrons arising in the coolant samples, and further shielding means associated with said detector for defining lateral boundaries of the location at which the emission of neutrons is detected.

2. Apparatus for testing for the occurrence of fuel element sheathing failure in a nuclear reactor, according to claim 1, wherein said auxiliary means comprises an injector operable to draw coolant samples through said sampling pipe and chamber.

3. A nuclear reactor having a core cooled by liquid metal and equipped with apparatus according to claim 1.

References Cited
UNITED STATES PATENTS

| | | | |
|---|---|---|---|
| 2,719,823 | 10/1955 | Linn | 176—19 |
| 2,741,592 | 4/1956 | Borst et al. | 176—19 |
| 2,872,400 | 2/1959 | Bugbee et al. | 176—19 |
| 2,911,343 | 11/1959 | Braffort et al. | 176—19 |
| 3,089,958 | 5/1963 | Tanner | 250—83.1 |
| 3,165,446 | 1/1965 | Utermyer | 176—19 X |
| 3,197,377 | 1/1965 | Ohlinger | 176—19 |

OTHER REFERENCES

Auslegeschrift, 1,039,145, Germany (inventor Stendel et al.), Auslegeschrift, Sept. 18, 1958, Kl 21g 21/10, A26379, VIII C/21g.

REUBEN EPSTEIN, *Primary Examiner.*